Patented Aug. 15, 1933

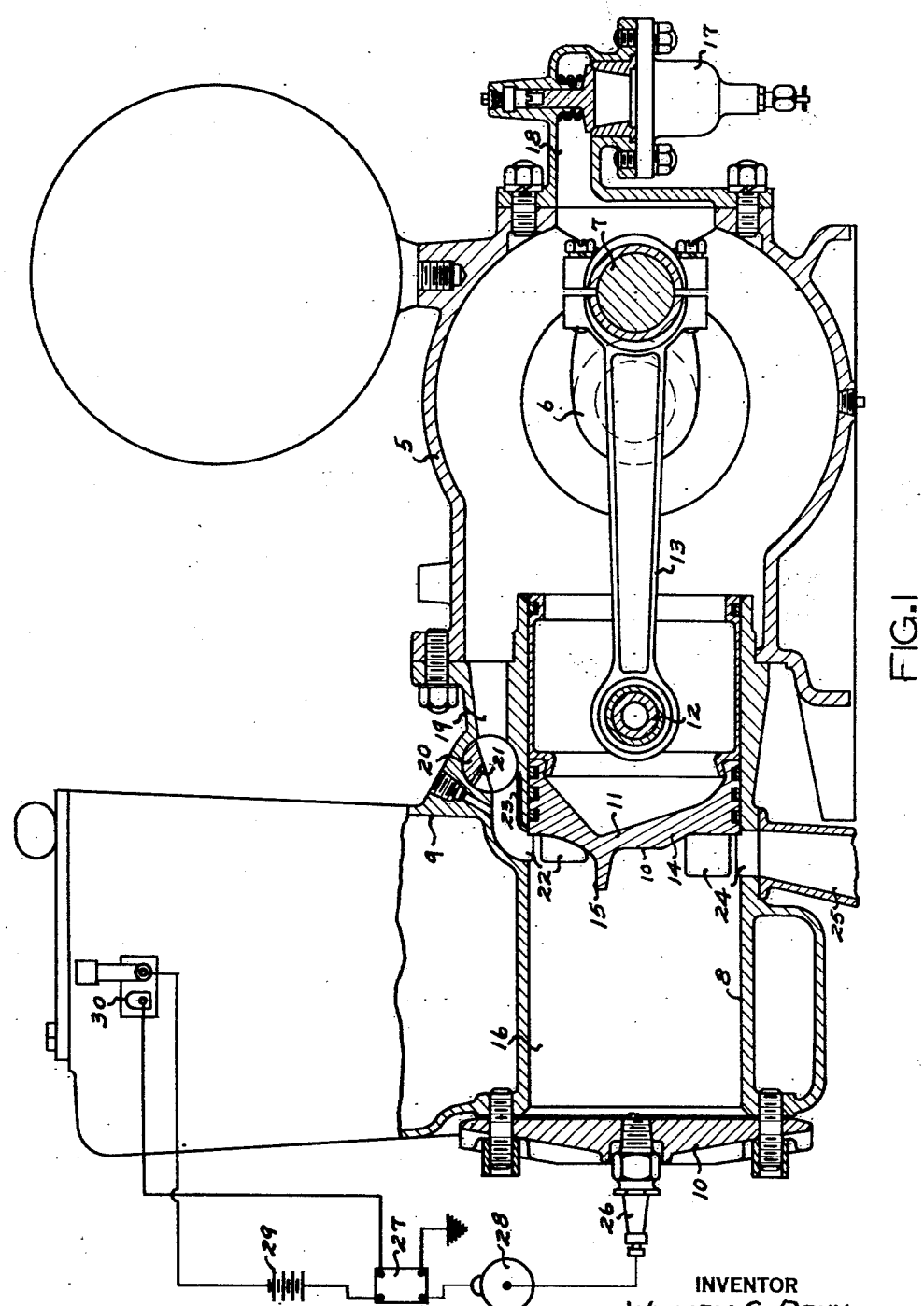

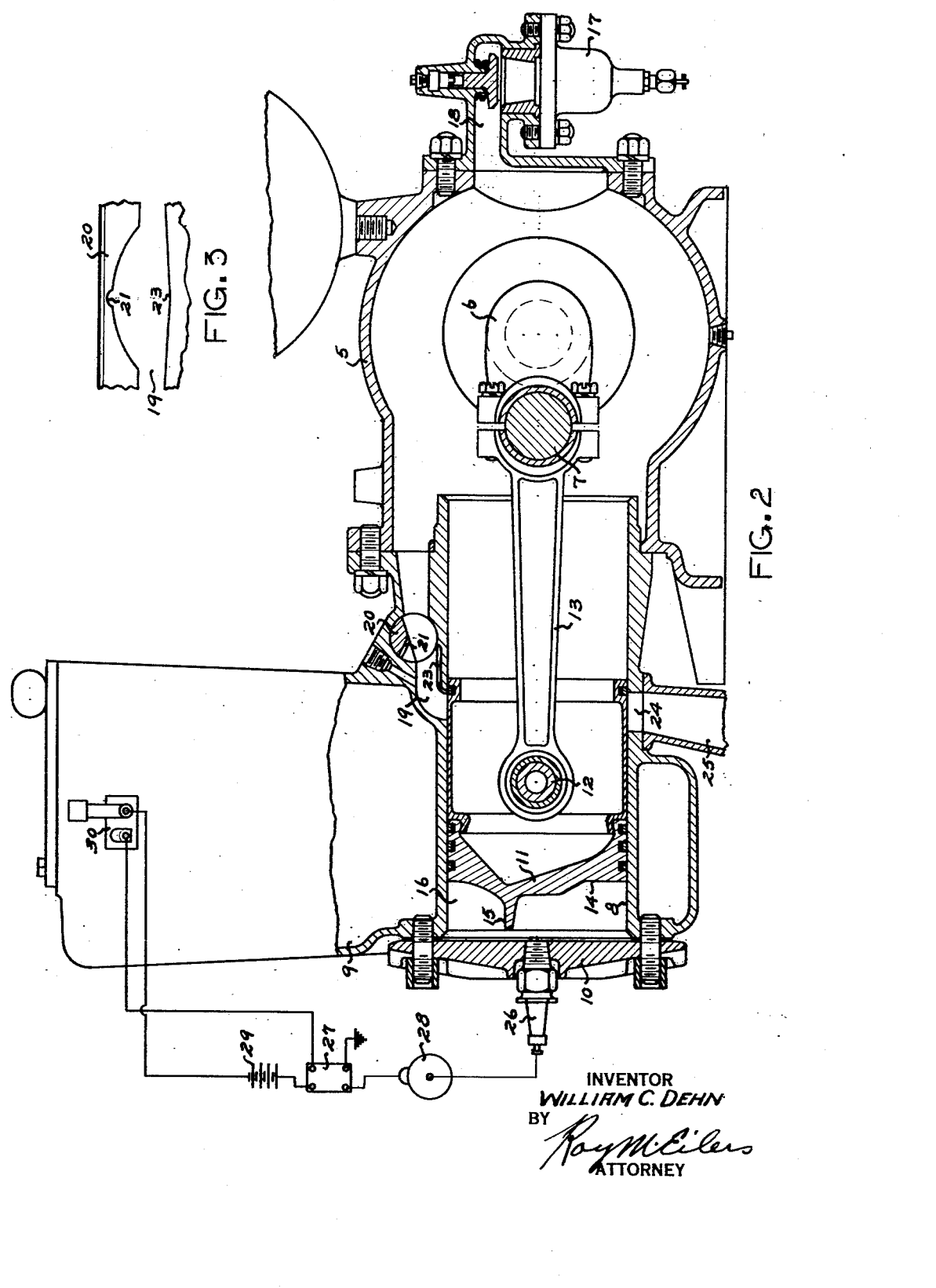

1,922,667

UNITED STATES PATENT OFFICE

1,922,667

FUEL IGNITING MEANS AND METHOD

William C. Dehn, Three Rivers, Mich., assignor to Fairbanks, Morse & Co., Chicago, Ill., a Corporation of Illinois Application August 29, 1930. Serial No. 478,679

11 Claims. (Cl. 123—73)

An object of this invention is attained in the production of internal combustion engines of low compression type which are capable of normal, sustained operation, after a starting period, without any form of electric ignition, and without the requirement of any extraneous energy supply for the purpose of igniting a compressed charge of fuel and air.

A further object of the invention is attained in an engine in which the fuel charge may be ignited selectively, either by electrical ignition impulses, as now well known in the art, or by means to be described resulting in a regular cyclic operation of the engine by transfer of sufficient heat for ignition purposes, from a charge previously burned within the cylinder of the engine.

A still further object is to effect an oxidation, at a reduced rate, of a relatively small portion of a fuel charge, as it is initially introduced, such that, as the charge approaches or attains its full compression, a substantially complete combustion of the entire charge is effected as a result of heat originally supplied at or near the beginning of the compression stroke.

Still another object of the invention is attained in increased smoothness of operation, a more protracted, gradual, combustion period, and an improved efficiency in operation.

Still a further object is to produce an internal combustion engine normally operable by effecting ignition of a combustible fuel mixture either by electric ignition or by self-ignition, and in which fuel consumption, noise of operation and vibration are minimized by operation of the engine without electrical ignition.

Further objects and advantages of the invention will appear to those skilled in the art, particularly from the ensuing description of parts of an engine employed in connection with the present invention, together with a description of the method involved in such operation, and from the accompanying drawings, in which:

Fig. 1 is a sectional elevation of a single-cylinder, two-cycle, two-port, crankcase-compression engine, constructed according to present preference, and showing the piston at bottom center position; Fig. 2 is a sectional elevation similar to Fig. 1, except that the engine piston is shown near top dead center position; and Fig. 3 is an elevation of a preferred form of throttle, together with certain associated structure preferably employed in connection with the engine shown in Figs. 1 and 2.

The ensuing description deals with but one power cylinder, as the present drawings relate to a single cylinder engine. This invention is, however, equally applicable to a multi-cylinder engine, in which the presently described structure would of course be multiplied accordingly.

Referring now by reference characters to the drawings, 5 indicates a crankcase which may be of more or less conventional design and preferably of reasonably fluid tight construction, serving to support by means of bearings (not shown), a crank shaft 6, which in turn is provided with a crank pin 7. Supported adjacent the crankcase 5 is a power cylinder 8, which is preferably of water-cooled construction, being associated with a hopper 9 and water jacket adapted to contain a suitable supply of cooling fluid. The head 10 is by preference detachable and provided with cooling ribs or fins, so as to be directly air cooled.

Operable within the power cylinder 8 is a piston 11, provided with a piston pin 12 which in turn is connected to a rod 13 adapted for operative connection with the crank pin 7.

The piston 11 is preferably of a compound metallic construction and may be of the so called "white top" variety embodying, for example, a head portion 14 which may be cast from a suitable aluminum alloy, while the skirt portion of the piston is of cast iron. The piston head 14 includes a baffle or deflector 15, shaped, by preference, substantially as shown and extending transversely of the piston face, substantially the full chord width thereof. One or the upper side of the baffle 15 is preferably rounded into convergence with the plane surface of the top 14, substantially as appears in Figs. 1 and 2, and the face of the piston on the opposite or under side of the baffle is preferably constructed in the form of an irregular curve substantially as shown.

The combustion chamber 16 is constituted in the example shown by the comparatively smooth cylindrical interior of the cylinder proper, together with the piston top 14 and the inner surface of the head 10, which, by preference, is of plane conformity and substantially parallel to the plane portion of the piston face 14.

Proceeding now to the fuel induction portion of the engine, there is provided at one or the inner end of the engine at substantially the location shown, a carburetor 17 which may be of suitable type and which is connected by an inlet pipe 18 with the interior of the crankcase 5. As is well known in the art, the mixture is drawn from the carburetor into the crankcase at the time when suction is induced in the case by the outward or upward movement of the piston 11. As the piston descends, the resulting fuel and air mixture is compressed in the crankcase and inner portion of the by-pass 19. Communication from the by-pass to the power cylinder is controlled by a throttle valve 20, which may be manually or otherwise suitably controlled by means not shown. This valve 20 is preferably of a solid cylindrical type, having a segmentally relieved portion, the central part of the segmental portion being notched, as indicated at 21. The by-pass 19 terminates in a cylinder inlet port 22, which is uncovered as the piston 11 approaches and attains its bottom dead center position. At the lowermost portion of the by-pass 19, (as it appears in Figs. 1 and 2), and extending between the valve 20 and the inlet port 22, is a groove 23 disposed longitudinally and centrally of the by-pass, in line with the notch 21, for a purpose which will hereinafter appear.

The cylinder shown is of the so-called two-port type, and in addition to the inlet port 22, is formed to constitute an exhaust port 24, with which is associated an exhaust pipe or manifold 25, for eduction of the exhaust gas to the atmosphere. The relative arrangement of ports 22 and 24 is, by preference, such that the exhaust port is uncovered as the piston descends, somewhat in advance of the time when the inlet port 22 is uncovered, and also such that the exhaust port remains open during practically all of the time that the inlet port 22 is effective in establishing communication between the by-pass and the power cylinder.

It is desirable when first starting the engine, but necessary only in effecting the first explosions, to ignite the mixture electrically, according to prevailing practice, and thus to permit the engine to attain a certain low operating speed. To the end of providing electrical ignition means, as for starting, I have shown a spark plug 26 with which is associated a coil 27 which may include an interrupter (not shown), a timer 28, a battery 29, and a switch 30 for opening and closing the ignition circuit. While I have shown the ignition system as being of the usual jump spark type, any other suitable form of controlled ignition may be provided for use during the starting period.

The engine presently described as constituting one embodiment of the invention, has been designed particularly for certain automotive uses, particularly as an engine for propelling railway motor cars. In this service the engine is usually located between the deck and seat structure so that access may be had to the engine through an opening in the seat. In the particular example, therefore, the ignition switch 30 is disposed at a point easily accessible from the operator's position, in the present case, near the upper part of the hopper 9, so that soon after the engine is started the switch may be opened, thus minimizing the use of the battery 29.

The operation of the engine, apart from the self-ignition feature, to be hereinafter more fully referred to, is thought to be fully apparent to those skilled in the art, but may be briefly reviewed for sake of completeness. As the piston moves outwardly or toward the head of the cylinder, a vapor-air mixture is drawn from the carburetor through the inlet pipe 18 into the crankcase 5. As the piston descends, the mixture in the crankcase is compressed somewhat, and as the piston uncovers the inlet port 22, the crankcase compression serves to cause a movement of the mixture from the by-pass 19 through the opening in throttle 20 and the inlet port 22, into the cylinder. As the piston again moves upwardly or outwardly, the charge is compressed, and at or near top center position of the piston, is ignited under the influence of electrical ignition by the spark plug 26. As the piston again descends on the power stroke and uncovers the exhaust port, the charge introduced through the inlet port, being deflected toward the head of the cylinder 15, serves not only to scavenge the cylinder of exhaust gases, but displaces such gases with a combustible charge ready for a succeeding cycle. As thus far described, the operation is such as usually takes place in a two-cycle, two-port scavenging engine.

Considering now the operation as practiced with the self-ignition feature, it is usually considered in engines of the type noted that the cylinder scavenging, while it approaches completeness, is usually practically incomplete; certain isolated pockets or strata of the relatively warm exhaust gases remaining in relatively small amounts in the cylinder. It appears that when employing a throttle having a distinct notch or groove, such as shown at 21, in connection with a piston having a baffle substantially as shown at 15, a portion of the incoming stream of fuel mixture, as it enters the cylinder, is brought into such relation with either the outgoing exhaust stream or certain of the exhaust gases remaining in the cylinder, that this portion of the incoming fuel stream is energized to effect certain physical and/or chemical changes therein, such changes being either in the nature of a preliminary heating effect, of a portion of the mixture, or a slow oxidation of a restricted portion of the fresh charge; the energy thus imparted to the fresh charge, being sufficient when augmented by the energy in the form of heat produced by further compression, to cause ignition of the entire fuel charge. The portion of the incoming stream of mixture which is thus energized or oxidized when the piston is near its bottom center position, appears to be small, and since the pressure in the cylinder when the piston is at this point, approaches atmospheric, the rate of physical or chemical change and diffusion is low. However, as the piston again moves upwardly or outwardly, and compression begins, the heating of the originally small portion of the fluid increases, until, as the piston nears the cylinder head, the mixture volume is correspondingly reduced and the mixture proportionately compressed until at or near top center, self-ignition of the mixture takes place and the engine operates without being dependent upon the usual electrical ignition impulse. The example illustrated by the drawings has been found to operate on self-ignition through the greater part of its speed range possible with electric ignition, and to operate with a somewhat leaner mixture with self-ignition than is necessary for corresponding performance with electric ignition. This resulting fuel economy is of especial advantage in those types of two-cycle engine in which a lubricant is mixed with the fuel, thus conducing to oil economy as well as a reduced fuel consumption. The example illustrated by the drawings has been found to operate on self-ignition through the greater part of its speed range possible with electrical ignition.

The presently described method of attaining self-ignition is not to be confused with the practice of attaining ignition solely by compression of a fuel charge or air to the extent usual in engines of the so called Diesel or Semi-Diesel types, or others of high compression type. The present invention is applicable to low compression engines, by which is meant, for purposes of the present specification and claims, those types of engines employing a volatile hydrocarbon fuel, which is mixed with air and compressed for combustion to a pressure, say not to exceed 125 pounds per square inch. In practice, the present result of self-ignition has been attained in engines compressing the fuel-air charge to substantially 70 pounds gauge pressure, and the result is perfectly attained over substantially the greatest part of the speed range of the engine possible with electric ignition.

The present result is further not to be confused with ignition expedients of the so called "hot spot" variety, it being certain that the present result is attained without incandescence of any parts internal of the combustion space, and is as practically attainable even though the cooling fluid space may be filled with ice, as when the cylinders is held at boiling temperature. That the result presently described is in no way dependent upon a deposit of carbon, and hence is not to be confused with preignition, is evidenced by the fact that a new engine, in which no carbon can have accumulated, operates as reliably on self-ignition as one which may have been in service for a considerable period of time.

It is, of course, known to those experienced in the engine arts that an occasional ignition of low compression engines may be effected by carbon deposits, by "hot spots", by wires heated to incandescence, and other chance ignition phenomena, but as far as I am aware none of these expedients is capable of operating the engine according to its intended cycle and over any substantial range of speed and throttle opening.

The method involved in operating an engine according to present principles and with the apparatus described, consists in introducing the fuel mixture to the combustion space in such a manner that just prior to and during the introduction of at least a portion of the fuel charge to the cylinder, a part of the mixture or charge is preferably confined to a restricted channel, as by the notch 21 and groove 23, and is not initially diffused to any great extent, with the air and exhaust gases remaining in the cylinder. This portion of the fuel charge which may be designated as a carrier charge, is energized as above noted, upon its introduction to the cylinder. The heat content of this carrier charge is so augmented upon increase in compression during the outward movement of the piston, that upon attaining a maximum compression, the full fuel charge will be ignited by the carrier charge.

The foregoing description has dealt with the general arrangement and disposition of the different items of the apparatus. In order to enable those skilled in the art to ascertain definitely all factors contributing to the described result, it may be noted that the drawings appended hereto and forming a part of the present disclosure, are illustrations, to scale throughout, of an engine successfully embodying the invention, and in which the cylinder bore and the piston diameter are each four and three quarters inches, and the stroke four and three quarters inches. The size, and dimensions of the throttle, by-pass, piston baffle, the inlet and exhaust ports, the length of the exhaust pipe, and any other dimensions and proportions of this experimental engine may thus be determined exactly by reference to the various appended illustrations of the several parts and the assembly.

The present description has dealt in detail with the parts of an engine which has proven particularly satisfactory in operation without extraneous ignition. This description is, of course, applicable with particularity to the particular disclosure, and should therefore be understood merely in an illustrative, and not in a limiting sense, since obviously, certain of the features of the present construction may be varied substantially or omitted altogether, without destroying the result attainable by their combination and conjoint use. A number of changes will appear as possible to those skilled in the art, without departing from the spirit and full intended scope of the invention, as defined by the appended claims.

I claim as my invention:

1. A two cycle internal combustion engine of low compression type including a piston, a cylinder, a crankcase adapted for initial compression of a fuel charge, a fuel intake conduit between the crankcase and cylinder, provided with an auxiliary, longitudinal fuel channel, a throttle in said conduit disposed remotely from the cylinder and arranged to control both said conduit and auxiliary fuel channel, an exhaust port in the lower portion of the cylinder substantially in the cylinder plane of the outlet of said conduit, said conduit and the channel therein, and said exhaust port and piston being arranged to initiate oxidation of a fuel charge substantially upon its introduction to the cylinder, and prior to compression thereof in the cylinder.

2. An internal combustion engine of two-cycle low compression type, including, in combination with a piston and a cylinder having an exhaust port, a throttle having a peripheral indent, a fuel conduit directed from the throttle into the cylinder at a point near the exhaust port, an open auxiliary channel in said conduit and disposed in line with said indent, and a deflector on said piston, said throttle, said channel and said deflector being arranged for causing propagation of oxidation of a portion of a fuel charge between the time of its introduction to the cylinder through said conduit and channel, and the time of its final combustion.

3. In an internal combustion engine of two-cycle, crankcase compression type, in combination, a piston, a cylinder, a fuel intake conduit forming a by-pass between the crankcase and cylinder, a throttle disposed substantially intermediate the ends of said intake conduit and an open, auxiliary fuel channel in said conduit, between said throttle and said cylinder.

4. In an internal combustion engine in combination with a cylinder and piston, a fuel intake conduit, a throttle adapted to control delivery through said conduit, an indent in said throttle adapted to permit the passage of a restricted stream of fluid mixture, and an auxiliary open channel in said conduit, in substantial alignment with said indent.

5. In combination with an internal combustion engine of self-igniting low compression type, a crankcase and means associated therewith for initially compressing a fuel charge, a conduit between the crankcase and cylinder, a throttle having an indented portion, and disposed between the crankcase and cylinder, an open auxilliary channel located between the throttle and cylinder in said conduit, means on the piston for directing a restricted portion of the fuel charge and a portion of the exhaust gases into oxidizing adjacence at the beginning of a compression stroke of said piston, said directing means being formed of a material other than that constituting the body of the piston.

6. In an internal combustion engine of two-cycle low compression, crankcase scavenging type, a piston, a cylinder, a crankcase, a by-pass between the crankcase and the inner end of said cylinder, said by-pass terminating in an inlet port, a throttle having a notched or indented portion disposed in said by-pass, an open auxiliary groove in said by-pass disposed between the throttle and cylinder and in line with the indent of said throttle, a baffle on said piston extending transversely of the face thereof, and formed of a material different than that of the body of said piston, an exhaust port so disposed with respect to said inlet port as to be opened in advance of the inlet port and to remain open during the time said inlet port is open, said throttle, ports and baffle being arranged to initiate oxidation of the charge upon introduction thereof to the cylinder, to continue such oxidation through the compression stroke of said piston, whereby completely to ignite the remainder of the charge substantially at the beginning of the power stroke of said piston.

7. The herein described method of operating an internal combustion engine of two-cycle low compression type, which consists in initially introducing a fuel charge substantially at bottom center position of the piston, and at a point near the stream of exhaust fluid, for the purpose of heating said incoming fuel charge, and in augmenting the temperature of the incoming fuel charge by compression to an extent sufficient to effect self-ignition thereof substantially upon completion of such compression.

8. The herein described method of operating an internal combustion engine of low compression type including a piston and cylinder having a piston-controlled inlet port, which consists in introducing to the cylinder at a point adjacent the piston when near bottom center position, a series of volatile fuel and air mixture charges through said port, and in heating each of said charges to igniting temperature by combining a heating effect of combustion of a preceding charge burned in said cylinder, with the heating effect of concurrent compression of said series of fuel charges.

9. The herein described method of operating an internal combustion engine of low compression type, which consists in introducing a normal combustible charge of a fuel and air mixture when the piston is in lower or innermost position, in compressing said charge, in initiating oxidation of said charge before compression thereof, continuing oxidation through the compression period, and in completing the oxidation of said charge without extraneous energy for ignition purposes, substantially upon completion of its compression.

10. The herein described method of igniting a fuel charge in an internal combustion engine of low compression type, which consists in introducing to the inner end of a cylinder with a piston therein near inner or bottom center, a normal or principal charge, together with an auxiliary stream of combustible air and fuel mixture, in effecting a delayed oxidation of said auxiliary stream while compressing the principal charge of fuel in the cylinder, and in igniting the full normal fuel charge from said auxiliary fuel stream, substantially upon complete compression of the full fuel charge.

11. The herein described method of operating a two-cycle internal combustion engine of low compression type which consists in introducing a combustible fuel and air charge to the cylinder, at a point near the piston, when the piston is near the end of a working stroke, in bringing a part of the said charge into contact with residual combustion products to initiate its oxidation at a reduced rate, in continuing the oxidation of the charge throughout the time it is being compressed, and in later igniting the charge as a whole from the previous oxidation of a small portion thereof.

WILLIAM C. DEHN.